United States Patent
Kitamura et al.

(10) Patent No.: US 7,616,261 B2
(45) Date of Patent: Nov. 10, 2009

(54) FOLDING COMMUNICATION TERMINAL APPARATUS

(75) Inventors: Kazuo Kitamura, Osaka (JP); Toshiya Yabe, Osaka (JP); Nobuaki Oosawa, Osaka (JP); Kazuaki Nakae, Osaka (JP); Hirokazu Hoshino, Hyogo (JP)

(73) Assignee: Kyocera Corporation, Kyoto (JP)

( * ) Notice: Subject to any disclaimer, the term of this patent is extended or adjusted under 35 U.S.C. 154(b) by 702 days.

(21) Appl. No.: 10/498,012

(22) PCT Filed: Mar. 4, 2002

(86) PCT No.: PCT/JP02/01963

§ 371 (c)(1),
(2), (4) Date: Feb. 25, 2005

(87) PCT Pub. No.: WO03/053027

PCT Pub. Date: Jun. 26, 2003

(65) Prior Publication Data

US 2005/0157174 A1    Jul. 21, 2005

(30) Foreign Application Priority Data

Dec. 19, 2001   (JP)   ............................ 2001-386483
Dec. 21, 2001   (JP)   ............................ 2001-390609
Dec. 27, 2001   (JP)   ............................ 2001-398619
Dec. 28, 2001   (JP)   ............................ 2001-398976

(51) Int. Cl.
*H04N 11/00*   (2006.01)
*H04N 7/00*    (2006.01)
*H04N 5/222*   (2006.01)
*H04N 5/225*   (2006.01)
*H04M 1/00*    (2006.01)
*H04B 1/38*    (2006.01)

(52) U.S. Cl. ............. 348/552; 348/333.01; 348/333.06; 348/333.11; 348/333.12; 348/373; 455/556.1; 455/566; 455/575.3

(58) Field of Classification Search ............. 455/566.1, 455/575.3, 556.1; 348/333.01, 333.06, 333.11, 348/333.12, 373, 552; D14/138
See application file for complete search history.

(56) References Cited

U.S. PATENT DOCUMENTS 5,559,554 A  *  9/1996  Uekane et al. ......... 348/333.02

(Continued)

FOREIGN PATENT DOCUMENTS

EP    0 898 405 A2    2/1999

(Continued)

OTHER PUBLICATIONS

Office Action from KR Patent Application No. 2008-7023859, dated Jan. 5, 2009.

*Primary Examiner*—Tuan V Ho
*Assistant Examiner*—Wanda M Negron
(74) *Attorney, Agent, or Firm*—Morrison & Foerster LLP

(57) ABSTRACT

A communication terminal apparatus (1) includes a first casing (41) and a second casing (42) which are foldably connected to each other and have a photographic lens (31) and a display device (18) which is visible in a same field of view as the lens. A user can photograph himself/herself while verifying his/her photographed image by means of the display device, and thus is able to gain an anticipated image composition easily, and therefore reduce unsuccessful photographs. The photographed image is displayed as a mirror image, so that the user can verify the image as if looking in to an ordinary mirror, without experiencing any awkwardness.

4 Claims, 11 Drawing Sheets

U.S. PATENT DOCUMENTS

| | | | |
|---|---|---|---|
| 5,896,575 A * | 4/1999 | Higginbotham et al. | 455/566 |
| 6,069,648 A * | 5/2000 | Suso et al. | 348/14.02 |
| 6,389,267 B1 * | 5/2002 | Imai | 455/90.1 |
| 6,466,202 B1 * | 10/2002 | Suso et al. | 345/169 |
| 6,510,325 B1 * | 1/2003 | Mack et al. | 455/575.2 |
| 6,518,956 B1 * | 2/2003 | Sato | 345/173 |
| 6,697,083 B1 * | 2/2004 | Yoon | 345/658 |
| 6,704,586 B2 | 3/2004 | Park | |
| 6,865,406 B2 | 3/2005 | Park | |
| 7,046,287 B2 * | 5/2006 | Nishino et al. | 348/333.06 |
| 2001/0011029 A1 * | 8/2001 | Iwabuchi et al. | 455/566 |
| 2001/0036845 A1 * | 11/2001 | Park | 455/566 |
| 2001/0049293 A1 * | 12/2001 | Shimazaki | 455/550 |
| 2001/0055987 A1 | 12/2001 | Tsuchida | |
| 2002/0051060 A1 * | 5/2002 | Wada | 348/207 |

FOREIGN PATENT DOCUMENTS

| | | |
|---|---|---|
| EP | 954150 A2 * | 11/1999 |
| EP | 1 033 857 A2 | 9/2000 |
| GB | 2343324 A * | 5/2000 |
| JP | 2000-333148 | 11/2000 |
| JP | 2001-186227 | 7/2001 |
| JP | 2001-186396 | 7/2001 |
| JP | 2001-320463 | 11/2001 |
| JP | 2001-333167 | 11/2001 |
| JP | 2001-345899 | 12/2001 |
| JP | 2002-62849 | 2/2002 |
| KR | 2001-0000388 | 1/2001 |
| KR | 2001-0058755 | 7/2001 |
| KR | 2001-0068807 | 7/2001 |

* cited by examiner

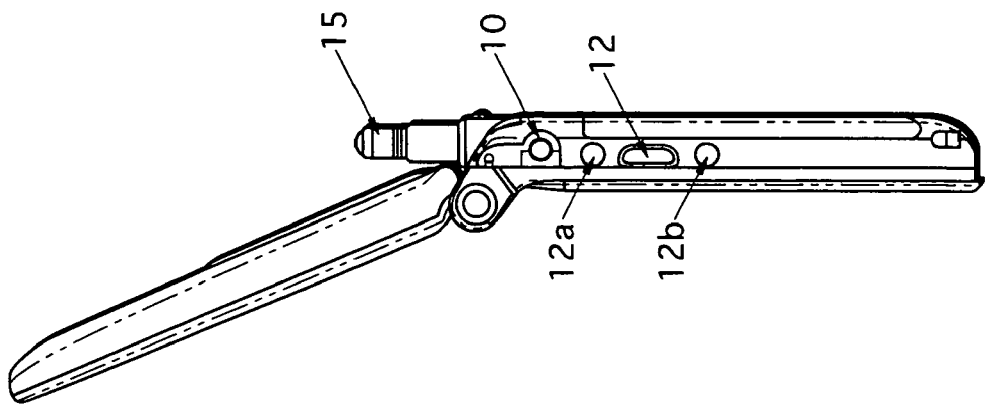
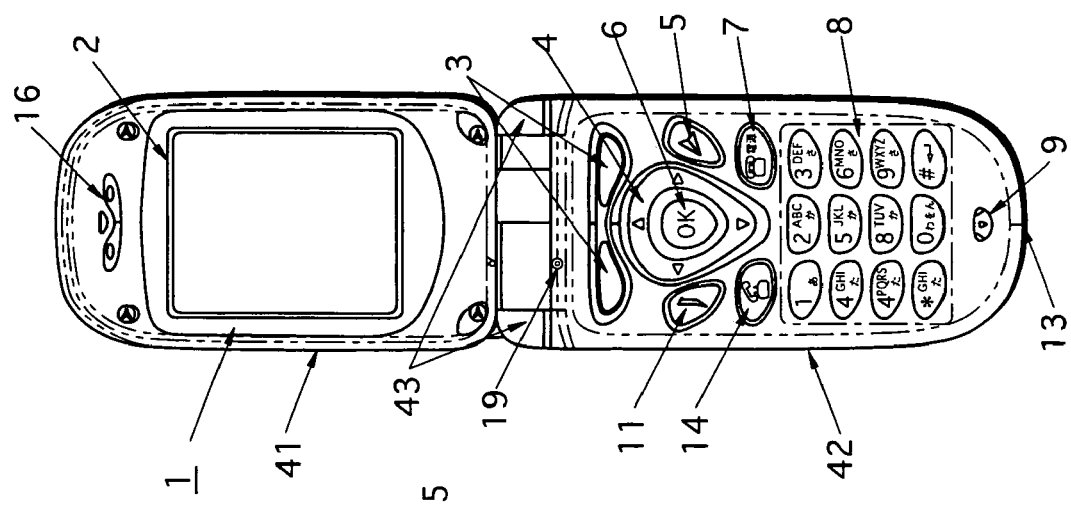
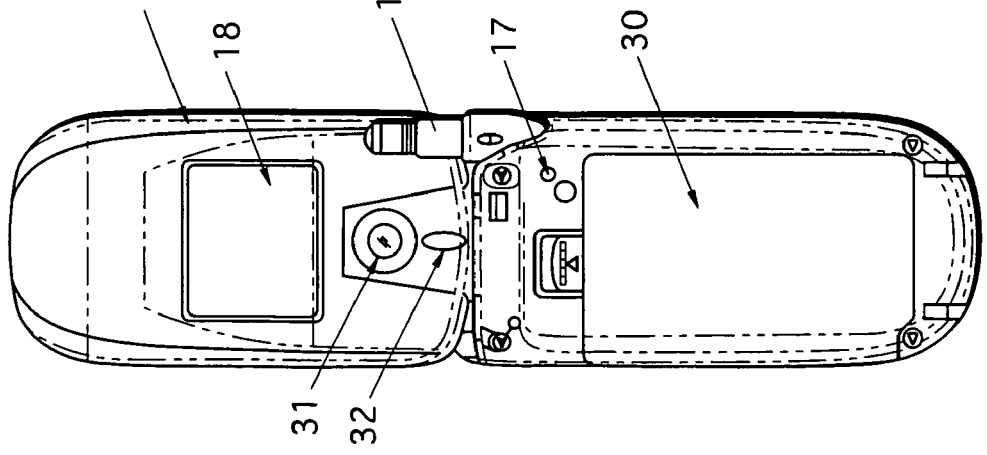

FIG.10
| TELEPHONE NUMBER 101 | PHOTOGRAPHED IMAGE 102 | NAME 103 |
|---|---|---|
| 090-1234-5678 | 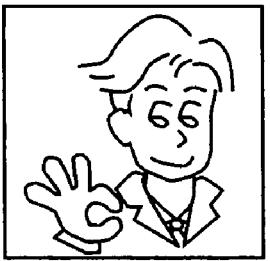 | YAMADA TARO |
| 090-8888-7777 |  | SUZUKI HANAKO |

FOLDING COMMUNICATION TERMINAL APPARATUS

FIELD OF THE INVENTION

The present invention relates to a folding communication terminal apparatus having a photography function, and in particular to a technique for improving convenience when a user takes a picture of himself/herself.

BACKGROUND ART

In recent years mobile communication services using, for example, systems such as PHS (Personal Handyphone System), PDC (Personal Digital Cellular telecommunication system), and CDMA (Code Division Multiple Access) have become widely used due to the development of smaller, lighter-weight communication terminal apparatuses, improvements in communication quality, and reductions in both apparatus prices and telephone call charges.

Some communication terminal apparatuses for using mobile communication services have photography functions. Visual communication is stimulated by the use of such communication terminal apparatuses, as not only exchanges of voice conversation and electronic mail text information, but also photographs of a user's facial expressions, and scenery of travel destinations and the like can be taken and sent to another person.

A particular type of conventional communication terminal apparatus having a photography function is foldable, and is provided with a photographic lens in a position which is exposed when the apparatus is in a folded state, and a display device, which displays a photographed image, in a position which is concealed in the folded state. Further, a mirror is provided in a position which can be viewed in the same field of view as the lens. Note that the display device and the lens cannot be viewed within the same field of view.

According to this communication terminal apparatus, when a user faces the lens to take a photograph of himself/herself, because he/she cannot see the display device, there is an inconvenience of being unable to verify the exact image being photographed, however this inconvenience is solved to some extent by using the image reflected in the mirror as a guideline for the image being photographed.

Some other conventional communication terminal apparatuses having photography functions have a straight shape which is not foldable, and are provided with a photographic lens and a display device which displays the photographed image on an opposite surface of a casing to the surface on which the lens is provided. Further, a mirror is provided in a position which can be viewed in the same field of view as the lens.

The image reflected in the mirror is also used as a guideline for the image being photographed in this communication terminal apparatus when a user takes a photograph of himself/herself, because the lens and the display device cannot be viewed at the same time.

However, a problem exists in both of the abovementioned conventional communication terminal apparatuses in that repeated re-photography is necessary as an anticipated image composition is gained with difficulty when a user takes a photograph of himself/herself, because the image reflected in the mirror is not the exact image being photographed.

DISCLOSURE OF THE INVENTION

In order to solve the abovementioned problem, the object of the present invention is to provide a communication terminal apparatus which has a photography function, and which primarily solves the inconvenience encountered when a user takes a photo of himself/herself, while providing various convenient facilities for photography.

The communication terminal apparatus of the present invention has a photography function, and is made up of a first casing and a second casing which are foldably connected to each other, the communication terminal apparatus including: a detecting unit operable to detect whether or not the first and second casings are in a folded state; a photographic lens provided on a first surface of the first casing, the first surface being exposed when the first and second casings are in a folded state; a first display device that is for displaying a photographed image, and that is visible in a same field of view as the lens; and a second display device that is for displaying the photographed image, and that is provided on a second surface of the first casing, the second surface being concealed when the first and second casings are in the folded state, wherein the first display device displays a photographed image when the detecting means is detecting that the first and second casings are in the folded state, and the second display device displays a photographed image when the detecting means is detecting that the first and second casings are not in the folded state.

Further, the lens may be positioned on a line which divides a width of the first display device substantially in half.

Further, the lens and the first display device may both be positioned substantially in a widthwise center of the first surface.

Further, the communication terminal apparatus may have a construction such that a battery is detachable from a third surface of the second casing, the third surface being exposed in the folded state.

Further, the communication terminal apparatus may further include a speaker provided within the second casing, and an opening being formed in the third surface of the second casing, in a vicinity of the speaker, the third surface being exposed in the folded state.

According to any of the above structures, unsuccessful photographs can be reduced as both the lens and the image being photographed which is displayed on the first display device, can be viewed within the same field of view, and a user taking a photograph of himself/herself is able to verify the actual image being photographed, thus gain an anticipated image composition more easily.

In particular, according to the structure in which the lens is positioned on the line which divides the width of the display device approximately in half, when the person who is the object of the photograph takes a photograph while looking at the first display device, a natural-looking image can be obtained as the person is looking approximately straight ahead.

Further, the communication terminal apparatus may further include: a detecting unit operable to detect whether or not the first and second casings are in the folded state; and a photograph start instruction receiving unit operable to receive a photograph start instruction, wherein when the photograph start instruction receiving unit receives the photograph start instruction, periodic photography starts, and the first display device displays a photographed image or mirror image thereof every time photography is performed, while the detecting unit detects that the first and second casings are in the folded state.

According to this structure, unsuccessful photographs can be reduced as both the lens and the image being photographed which is displayed on the first display device, can be viewed within the same field of view, and a user taking a photograph of himself/herself is able to verify the actual image being photographed, thus gain an anticipated image composition more easily. In a case where the first display device displays a mirror image, the user is able to verify the image being photographed as if looking into an ordinary mirror, therefore does not experience any awkwardness.

Further, after the photograph start instruction is received, the second display device may display a photographed image every time photography is performed, while the detecting unit detects that the first and second casings are not in the folded state.

In addition to the abovementioned effects, according to this structure, the user is able to correctly verify the photographed image the right way around, using the second display device, as the photographed image is displayed as a non-mirror image on the second display device.

Further, the first display device may be an externally-illuminated display device or a self-illuminated display device, and may be in an unilluminated state while the detecting unit detects, after the photograph start instruction is received, that the first and second casings are not in the folded state.

In addition to the abovementioned effects, this structure produces a power-saving effect.

Further, the communication terminal apparatus may further include: a buffer unit operable to be updated with a newest image every time a photograph is taken; and a photograph end instruction receiving unit operable to receive a photograph end instruction, wherein the periodic photography ends when the photograph end instruction receiving unit receives the photograph end instruction, and the first display device displays an image stored in the buffer, or mirror image thereof, if the detecting unit is detecting that the fist and second casings are in the folded state when the photograph end instruction is received.

According to this structure, because the lens and the photographed image displayed on the first display device are able to be viewed in the same field of view, the user who has taken a photograph of himself/herself is able to verify the photographed image immediately after ending photography. When a mirror image is displayed, the user is able to verify the photographed image as if looking into an ordinary mirror, therefore does not experience any awkwardness.

Further, after the photograph end instruction is received, the second display device may display the image stored in the buffer unit, if the detecting unit detects that the first and second casings are not in the folded state.

In addition to the abovementioned effects, according to this structure, the user is able to correctly verify the photographed image the right way around using the second display device, as the photographed image is shown in the second display device as a non-mirror image.

Further, if the detecting unit detects the folded state when the second display device has been displaying the image, the first display device may display the image.

According to this structure, once the non-mirror image of the photographed image has been displayed on the second display device, the photographed image is then displayed on the first display device as a non-mirror image. Therefore the user, who has already verified the non-mirror image, can be presented with a suitable image without experiencing any awkwardness.

Further, the communication terminal apparatus may further include: a sound production unit operable to produce a sound at a first volume when the photograph end instruction is received while the detecting unit detects that the first and second casings are in the folded state, and to produce a sound at a second volume when the photograph end instruction is received while the detecting unit detects that the first and second casings are not in the folded state, wherein the first volume is higher than the second volume.

According to this structure, unauthorized photography can be prevented to some extent by informing that a photograph has been taken when photography ends. It can be anticipated that the effective prevention of unauthorized photography will be increased by setting a first volume for informing of photography performed in the less-noticeable folded state higher than a second volume which is set in the open state.

Further, the communication terminal apparatus may further include: an image storing unit operable to store one or more photographed images respectively in correspondence with one or more telephone numbers, wherein, when a call is received, if a telephone number of a caller making the call is notified, one photographed image among the one or more photographed images that is in correspondence with the notified telephone number is displayed.

According to this structure, because a photographed image of a person who is a caller can be displayed when a call is received from the caller, the user is able to know who the caller is immediately.

Further, the communication terminal apparatus may further include: a timer photograph instruction receiving unit operable to receive a timer photograph instruction, wherein after the timer photograph receiving unit receives the timer photograph instruction, photographs are taken periodically during a predetermined period, and the first display device displays a photographed image or mirror image thereof every time photography is performed.

According to this structure, unsuccessful photographs can be reduced as both the lens and the image being photographed, which is displayed on the first display device, can be viewed within the same field of view, and a user taking a photograph of himself/herself is able to verify the actual image being photographed, thus gain an anticipated image composition more easily. When a mirror image is displayed, the user is able to verify the photographed image as if looking into an ordinary mirror, therefore does not experience any awkwardness.

Further, the first display device may display information of time remaining until an end of the predetermined period, for the predetermined period, together with the photographed image or mirror image thereof.

Further, the communication terminal apparatus may further include: a light emitting element that is provided on the first surface, and that emits flashing light for the predetermined period.

Further, an interval between repetitions of the flashing light emission may change in response to the time remaining until the end of the predetermined period.

Further, the interval between repetitions of the flashing light emission may become shorter as the time remaining decreases.

According to any of these structures, the user who is the object of the photograph is able to obtain a guide indicating the end of the timer period according to the flashing light emission of the light emission element, and is better able to, for example, pose in time with the end of the timer period.

BRIEF DESCRIPTION OF THE DRAWINGS

FIGS. 1A to 1C are external views of the communication terminal apparatus of the present invention in an open state;

FIG. 10 is an example of the structure and contents of phonebook data; and

THE BEST MODE FOR CARRYING OUT THE INVENTION

Figure 2:
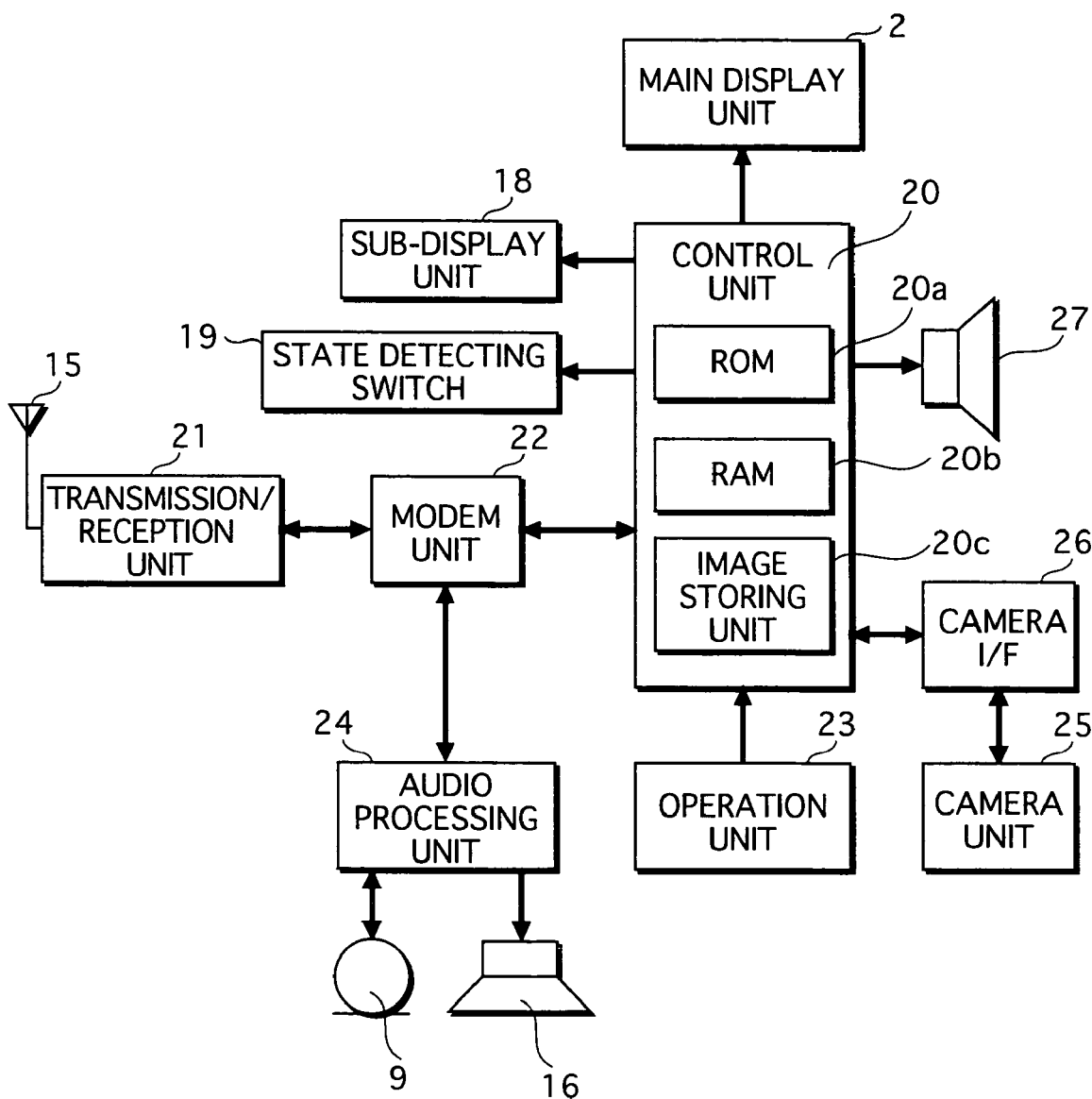
FIG. 2 is a block diagram showing the structure of the communication terminal apparatus of the present invention.

A preferred embodiment of the present invention will be described in detail with reference to the drawings.

FIGS. 1A to 1C are external views of the communication terminal apparatus of the present invention in an open state, FIG. 1A being a front view, FIG. 1B being a right side view, and FIG. 1C being a back view.

The main body 1 is a main body of the communication terminal apparatus, and is made up of a first casing 41 and a second casing 42 connected to each other so as to be foldable by a flexible unit 43. The communication terminal apparatus 1 is generally in the open state when telephone calls are made and operations relating to telephone calls and electronic mail are performed, and in the folded state during stand-by. The communication terminal apparatus 1 has a function in which a telephone number corresponding to a desired call destination is dialed automatically when the terminal communication apparatus is opened, after the call destination has been indicated from among stored telephone numbers when the terminal communication apparatus is in the folded state.

The main display 2 is a main display which is made up of a color liquid crystal display apparatus, a DMD (Digital Mirror Device), an organic EL display device, a PDP (Plasma Display Panel) or the like, and displays incoming-call information, notification information including present time information, character information expressing mail contents, and images either photographed by the communication terminal apparatus or received from an external device. The display contents of the main display 2 cannot be viewed by the user while the communication terminal device 1 is in the folded state, because the main display 2 is concealed in this state. Therefore, when the communication terminal apparatus is in the folded state, power is conserved by extinguishing a backlight or shutting off a power supply in the main display 2.

Flexible keys 3 are keys which are used together with other keys and buttons when setting various functions. For example, in a case where various function items are shown itemized in the lower part of the main display 2, the flexible keys are keys for selecting settings. During stand-by, the left button and the right button of the flexible keys 3 are given the functions of a function key and a text key respectively.

The four-point key 4 is a key which moves a cursor in four directions, (up, down, left and right), and causes the display contents to scroll in a specified direction. The four point key is also used for setting volume, revoking memory dial, redialing, and converting text to Chinese characters.

The email key 5 is a key that is operated when using electronic mail functions such as skymail, which is for handling a small number of characters, and long mail, which is able to handle large numbers of characters and use file attachments. The email key 5 is also used as a clear key for erasing text and returning to a previous display.

The OK key 6 is a key which is operated when an item being selected is determined or confirmed.

The end/power key 7 is a key which is used when switching the power on and off, ending a phone call, and putting a received call on hold.

Numerical keys 8 are keys used for inputting telephone numbers and text.

The microphone 9 is a microphone which obtains voice from a caller.

The earphone terminal 10 is a terminal to which an earphone microphone can be connected.

The WEB key 11 is a key which is used to transfer to a screen display for an Internet connection function. The WEB key 11 is also used when transferring to a screen display for the electronic mail function, when using web and station functions, and when displaying menus to make selections.

The side key 12 is a key which is used as a shutter button in photography performed by a camera apparatus which is later mentioned. During a photography mode, the side key gives a photograph start instruction when half-pressed, and then gives a photograph end instruction when fully pressed.

Here, the photograph start instruction refers to an instruction which causes the mobile terminal apparatus 1 to start periodically photographing, and the photograph end instruction is an instruction which causes the periodic photography to end and the last photographed image to be temporarily held. The held image is permanently stored in response to a separate storing instruction operation.

Note that when the communication terminal apparatus is in the open state, the asterisk key, which is included in the numeric keys 8, gives the photograph start instruction, and the OK key 6 gives the photograph end instruction.

When the side key 12 is fully pressed for more than a predetermined period of time in the folded state (for example more than three seconds), the newest image of the stored images is read and displayed on a sub-display 18. Further, when a down key 12b which is provided below the side key 12 is operated, another image which is one image older then the image being displayed is read and displayed, and when an up key 12a, which is provided above the side key 12 is operated, another image which is one image newer than the image being displayed is read and displayed. The display is performed having an applied wrap-around function, thus the next image displayed after the final image is the first image.

Note that when the up key 12a is fully pressed for a predetermined period of time (for example more than three seconds) or longer, in a case where an image is being displayed on the main display 2 or the sub display 18, the image being displayed is enlarged. On the other hand, when the down key 12b is fully pressed for more than a predetermined period of time (for example more than three seconds) or longer, the image being displayed is reduced (namely the up key 12a has a zoom in function, and the down key 12b has a zoom out function). The side key 12 is also used when setting and releasing a basic answerphone function, recording the voice of a caller during a call, and giving an instruction to replay recorded contents (namely, the side key 12 is also used as a memo button).

The external connection terminal 13 is a terminal which connects to a boost charger, cigarette lighter charger, or a mobile tool or the like.

The start key 14 is a key which is used when making and receiving telephone calls.

The antenna 15 receives and transmits radio waves.

The receiver 16 produces sound of the voice of a caller or person being called, and sounds of various types of messages and the like.

The opening 17 is formed for releasing sounds such as incoming-call ringtones, and incoming-call melodies and the like, and an incoming-call notification speaker is built in to the casing in a vicinity of the opening. Further, the incoming-call notification speaker produces a shutter sound when a photograph is taken by the below-mentioned camera apparatus. Note that the shutter sound is not only an ordinarily produced clicking sound, but can alternatively be produced as voice saying "photograph taken".

18 is a sub-display which is made up of a color liquid crystal display device, a DMD (Digital Mirror Device) or an organic EL display device or the like, and displays a part of information which is to be displayed on the main display 2 when the communication terminal apparatus is in the folded state. In particular, the sub-display 18, which doubles as both an incoming-call lamp which is normally provided in folding communication terminal apparatuses, and a photographic lamp, notifies of an incoming-call by flashing a light of a color which corresponds to the caller. Further, the sub-display 18 emits light in coordination with shutter open and close operations when taking photographs, and emits red light during charging.

Furthermore, the sub-display 18 is able to display images photographed by the below-mentioned camera apparatus, and displays the images as mirror images. Note that because the user is able to verify the display contents of the main display 2 while the communication terminal apparatus 1 is in the open state, power is conserved by extinguishing the sub-display 18 by cutting its power supply (to all circuit elements including the backlight). Further note that when operating the side key 12 while the sub-display 18 is extinguished, the backlight of the sub-display 18 illuminates, and then is extinguished again after a predetermined period has lapsed.

The state detecting switch 19 detects whether the communication terminal apparatus 1 is in the folded state, a fully opened state, or in a state which is between the folded and fully opened states. A common means for detecting an open angle between the first casing and the second casing, such as a microswitch, a light sensor, an encoder, or the like, can be used for the state detecting switch 19.

Note that the state detecting switch 19 may also be used only for detecting whether the communication terminal apparatus 1 is in the folded state or not.

The detachable rechargeable battery pack 30 supplies power necessary for the operations of the communication terminal apparatus 1.

The lens 31 is a lens of the camera apparatus which is built into the communication terminal apparatus. An image of an object such as a person and scenery are made into CCD or C-MOS artificial retina IC images (not illustrated) using the lens, and outputted as image data by the camera apparatus.

The incoming-call LED 32 is an LED which emits a green light when the communication terminal apparatus receives an incoming-call, an orange light when image data is displayed by the main display 2 or the sub-display 18, and a red light during charging. Further, when a timer photograph is being taken, the call-received LED flashes orange, an interval of flashes becoming shorter as the remaining time of the timer decreases. Accordingly, a person who is the object of a photograph is able to know the approximate timing of the end of the timer period.

The structural characteristics of the communication terminal apparatus 1 of the present invention are clearly explained in the abovementioned composition description. These structural characteristics are summarized below.

(1) The first casing 41 is provided with the main display 2 on the surface which is concealed in the folded state (hereinafter called the inside surface), and the sub-display 18 and the camera apparatus lens 31 on the surface which is exposed in the folded state (hereinafter called the outside surface.)

(2) The lens 31 is positioned on a line which divides the width of the sub-display 18 substantially in half.

(3) The lens 31 and the sub-display 18 are positioned approximately in the middle (in the widthwise direction) of the first casing 41.

(4) The battery charging unit which supplies necessary power for the operations of the communication terminal apparatus is constructed so as to be detachable from the outside surface of the second casing 42.

(5) The second casing 42 is inbuilt with the speaker which produces incoming-call ringtones, and the opening for releasing the produced ringtones is formed in the outside surface of the second casing 42, in the vicinity of the speaker.

Due to the above structural characteristics, when using the communication terminal apparatus of the present invention, the person who is the object of a photograph can easily verify photograph images, since the lens of the camera apparatus and the photograph images displayed by the sub-display can be viewed in the same field of view. A further characteristic of the communication terminal apparatus is that photography can be performed without the person in the photograph image having an unnatural gaze direction even when the person who is the object of the photograph photographs himself/herself while looking at the sub-display, since the camera apparatus lens is positioned on a line which divides the width of the sub-display approximately in half.

FIG. 2 is a block diagram showing the composition of the communication terminal apparatus of the present invention. The drawing shows, as an example, a case in which the present invention is applied to a portable terminal device of an IS-95 (Interim Standard 95) base CDMA (Code Division Multiple Access) system mobile phone. Note that the components which overlap with FIG. 1 are labeled with the same symbols as in FIG. 1, and are not explained here. Also note that a communication system is not limited to the CDMA system, but may be a PDC (Personal Digital Cellular) system or a PHS (Personal Handyphone System) or the like.

As shown in FIG. 2, the communication terminal apparatus 1 has an antenna 15, a transmission/reception unit 21, a modem unit (which includes a base band processing unit and the like) 22, a voice processing unit 24, a microphone 9, a receiver 16, a control unit 20, a main display unit 2, a sub-display unit 18, a camera unit 25, a camera I/F 26, an incoming-call notification speaker 27, a state detecting switch 19, and an operation unit 23.

The control unit 20 is made up of, for example, a microprocessor, a ROM (Read Only Memory) 20a, and a RAM (Random Access Memory) 20b, and performs various control operations by the microprocessor executing a control program stored in the ROM 20a. Also, the RAM 20b temporarily holds information to be transmitted, received information, and telephone book data (for example, data of 999 items in the memory dial) and the like, and then permanently saves the above information, according to battery backup, until an information erase/alter operation is performed.

The main display unit 2 and the sub-display unit 18 correspond to the main display 2 and the sub-display 18 respectively.

The operation unit 23 is made up of the flexible keys 3, the four point key 4, the email key 5, the OK key 6, the end/power key 7, numeric keys 8, the WEB key 11, the side key 12, and the start key 14.

In the communication terminal device 1 having the above composition, reception radio waves are received via the antenna 15 and demodulated in the modem unit 22. Voice information demodulated in the modem unit 22 is supplied to the voice processing unit 24, and after undergoing predetermined processing in the voice processing unit 24 according to the control of the control unit 20, the voice information is electroacoustically converted and outputted by the receiver 16.

Further, the received data which has been demodulated in the modem unit 22 is supplied to the control unit 20. The received data is made up of control data, character data (for example, the caller's telephone number), image data and the like, and is supplied to the main display unit 2 or the sub-display unit 18 as necessary to be displayed as text information and image information, and stored in the RAM 20b.

The control data includes incoming-call voice communication information (including the telephone number from which the call is being made), and incoming-communication information of character messages and electronic mail received via a system called an SMS bearer (short message bearer).

The inputted voice, however, is acoustoelectrically converted by the microphone 9, and after undergoing predetermined processing in the voice processing unit 24, is supplied to the modem unit 22. Further, information inputted from the operation unit 23 is supplied to the modem unit 22 as transmission data via the control unit 20 when necessary, as well as being stored in the RAM 20b. The modem unit 22 modulates a supplied audio signal and transmission data and the like, and sends a modulated signal from the antenna 15 via the transmission/reception unit 21.

The camera unit 25 is connected by a flexible cable to the camera I/F 26, which is connected to the control unit 20. When the user operates the operation unit 23 to give various instructions for photography, the control unit 20 outputs a control signal to the camera I/F 26 in response to each instruction. When the camera I/F 26 receives the control signal, it outputs a control instruction to the camera unit 25, and updates a buffer area provided in the RAM 20b with image data obtained from the camera unit 25.

The buffer area is updated with the newest image data every time photography is performed. When the user performs a separate save operation, the control unit 20 gives the image data in the buffer area an identification number and saves the image data permanently. At this time, specified image data (for example, a photographed image of a person who is to be called) is saved in correspondence with the telephone number within the telephone book, in response to a user operation.

Permanent saving of image data may be performed by providing battery backup to the RAM 20b, for example. On the other hand, since the RAM 20b generally has a low capacity, the image data may alternatively be saved in an image data storing unit 20c, which may be provided separately to exclusively store image data, and can be realized by using a flash memory or the like.

Note that the saved image data can be transmitted from the antenna 15 via the transmission/reception unit 21 after being modulated by the modem unit 22.

<Photograph Start>

Next the photography operations of the communication terminal apparatus of the present invention having the above-mentioned composition will be described in detail.

Figure 3:
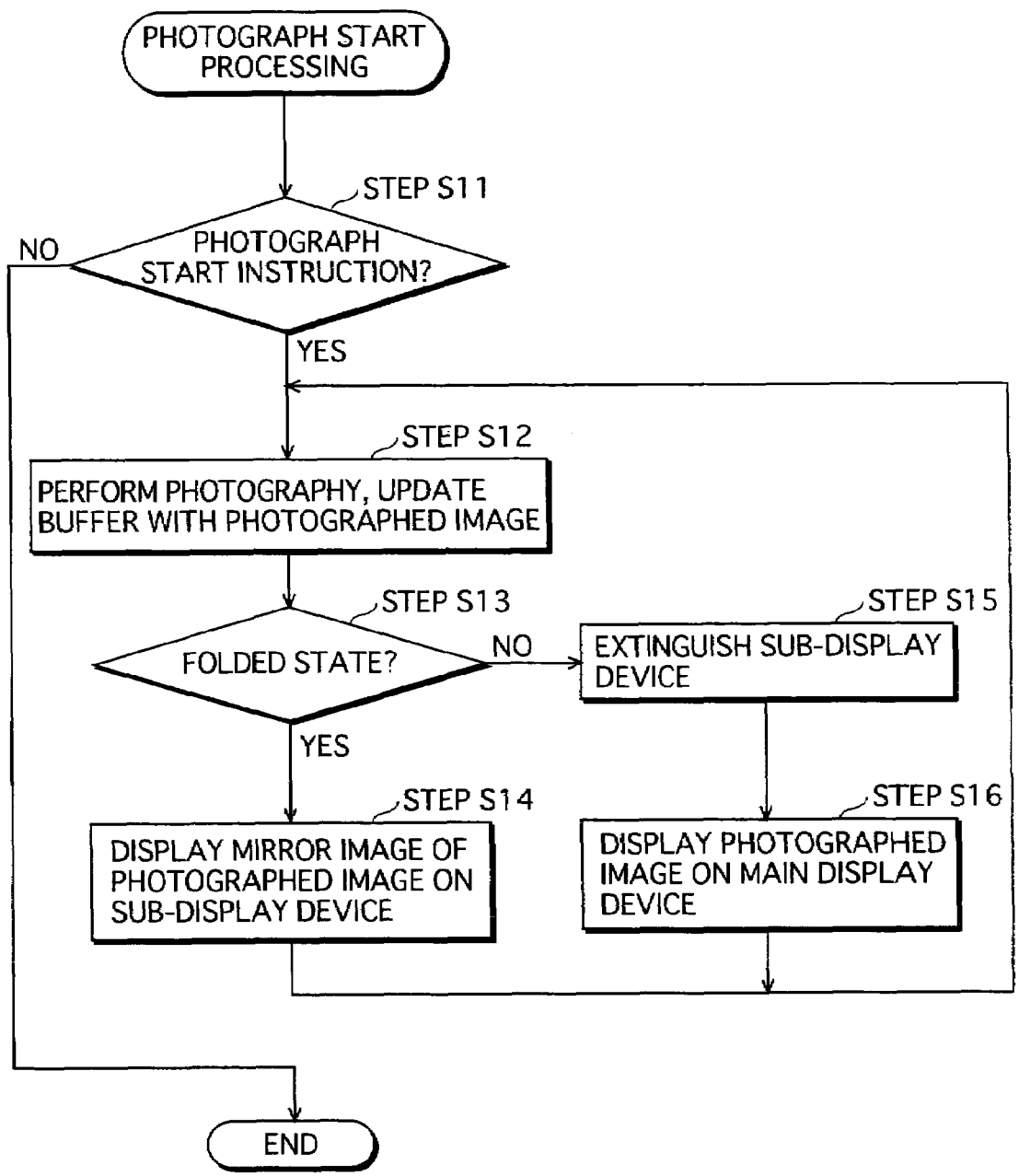
FIG. 3 is a flowchart showing operations of the communication terminal apparatus in response to a photograph start instruction.

FIG. 3 is a flowchart showing operations of the communication terminal apparatus which are performed when the photograph start instruction is received from the user.

By performing operations using the operation unit 23 when the communication terminal apparatus is in the folded state, the user transfers the communication terminal apparatus 1 into a photography mode, and then when the side key 12 is half pressed to give the photograph start instruction (step S11), the control unit 20 issues the camera unit 25 with a photograph instruction, the camera unit 25 performs photography and outputs image data to the control unit 20 via the camera I/F 26, and the control unit 20 updates the buffer area of the RAM 20b with the image data (step S12).

Note that the photograph start instruction is performed by operating the asterisk key which is included in the numeric keys 8, when the communication terminal apparatus 1 is in the open state.

On obtaining image data, the control unit 20 verifies whether the communication terminal apparatus 1 is in the folded state or not, by referring to output of the state detecting switch 19. Then, if the communication terminal apparatus 1 is in the folded state (step S13: YES), the object image is displayed as a mirror image (that is, laterally reversed) in the sub-display (step S14), and if the communication terminal apparatus 1 is not in the folded state (step S13: NO), the sub-display is extinguished (step S15), and the object image is displayed on the main display as is, without being reversed (step S16). After the photograph start instruction is received, processing from step S12 onwards is repeated every predetermined period, until the photograph end instruction is received.

Figure 4A:
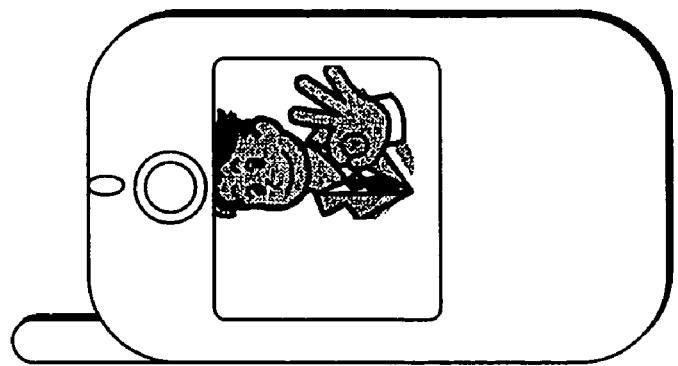
FIGS. 4A to 4C are examples of displays performed after the photograph start instruction has been received.
Figure 4B:
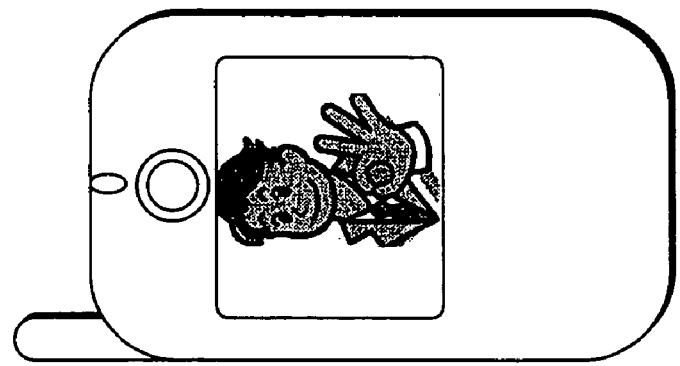
Figure 4C:
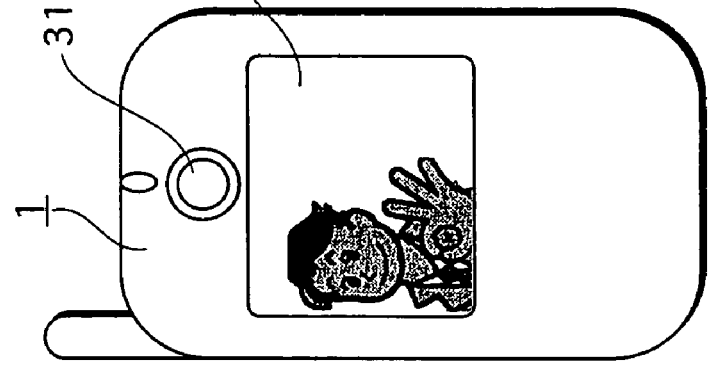

FIGS. 4A to 4C are examples of displays performed in the sub-display while the communication terminal apparatus 1 is in the folded state, after the photograph start instruction is received, assuming that the user is photographing himself/herself.

When the user poses, by making an OK sign with his/her right hand for example, and half-presses the side key 12 to give the photograph start instruction when the communication terminal apparatus 1 is in the folded state, the control unit 20 issues a photograph instruction to the camera unit 25, causing periodic (for example every 0.1 second) photography to start, and displays the object image as a mirror image in the sub-display 18 every time photography is performed (FIG. 4A to 4C.

FIGS. 5A to 5D are examples of displays performed in the sub-display and the main display after a photograph start instruction is received when the communication terminal apparatus 1 is detected as not being in the folded state.

Figure 5D:
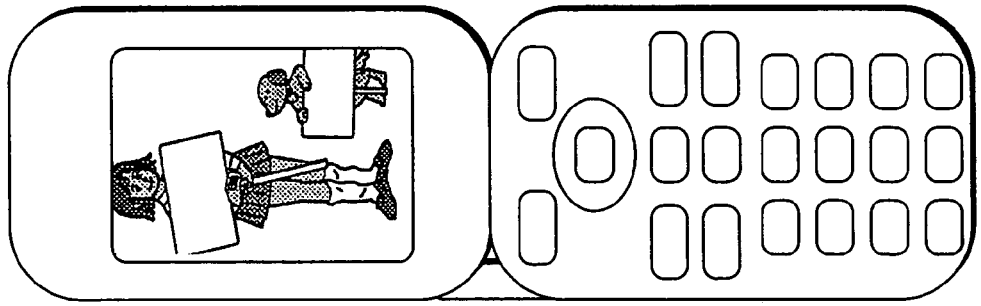
FIGS. 5A to 5D are further examples of displays performed after the photograph start instruction has been received.
Figure 5C:
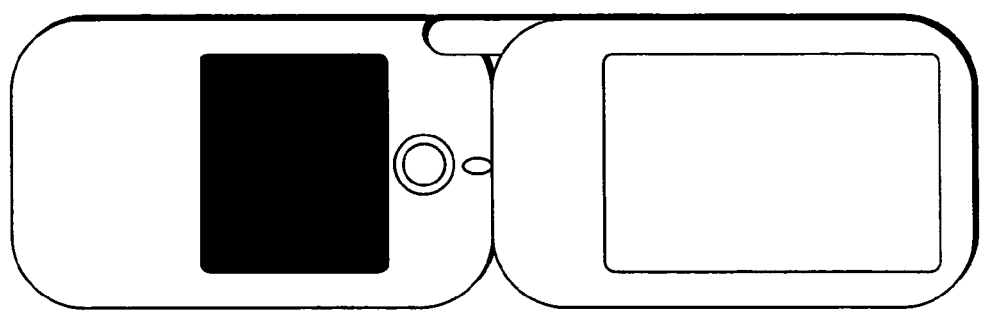

When the user opens the communication terminal apparatus 1 from a state where the object image is being displayed as a mirror image in the sub-display 18 (FIG. 5A) after photography starts in the folded state, the control unit 20 displays the last photographed object image which was photographed in the folded state as a non-mirror image on the main display 2 (FIG. 5B), and, as well as extinguishing the sub-display 18 to conserve power (FIG. 5C), continues photographing periodically, and displays an object image as a non-mirror image on the main display 2 every time photography is performed (FIG. 5D). In this example, a scene having a girl on the left hand side, and a dog on the right was photographed after opening the apparatus.

Figure 5B:
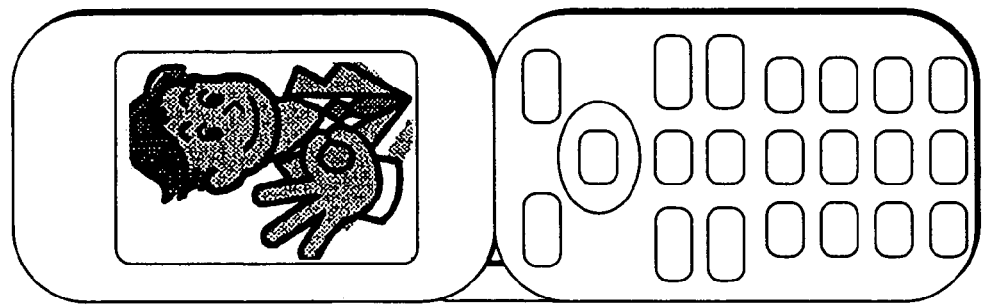
Figure 5A:
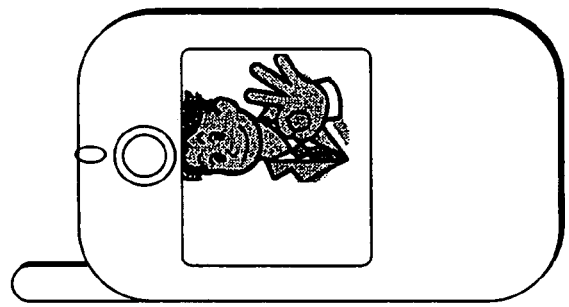

Note that the period of the display in FIG. 5B is only a short moment which is from when the apparatus is opened until the first photograph is taken.

<Photograph End>

Next the photograph end operations of the communication terminal apparatus of the present invention having the abovementioned structure are described in detail.

Figure 6:
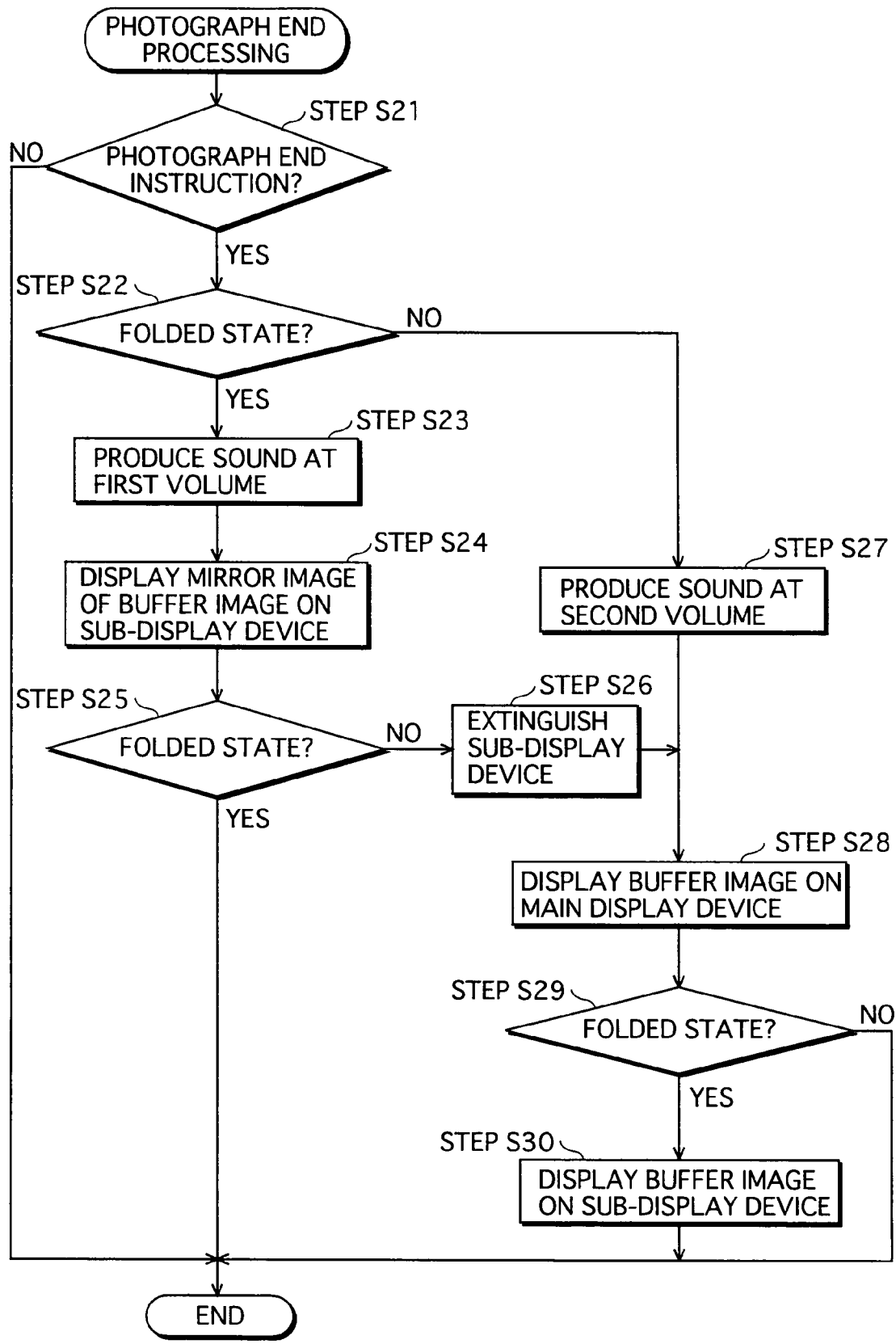
FIG. 6 is a flowchart showing operations of the communication terminal apparatus in response to a photograph end instruction.

FIG. 6 is a flowchart showing operations of the communication terminal apparatus which are performed when a photograph end instruction is received from the user. The photograph end instruction is an instruction issued by the user when a desired photograph image has been obtained during the abovementioned periodic photography, and is similar to a shutter operation in an ordinary camera or the like.

After photography starts, when the user gives a photograph end instruction by fully pressing the side key 12 while photographs are being taken periodically (step S21), the control unit 20 stops taking further photographs, and verifies whether the communication terminal apparatus 1 is in the folded state or not by referring to the output of the state detecting switch 19. If the communication terminal apparatus 1 is in the folded state (step S22: YES), the control unit 20 gives notification that photography has been performed by producing the shutter sound at a first volume (step S23), and displays the last object image photographed by the camera apparatus 31, which is being stored in the RAM 20b buffer area, on the sub-display as a mirror image (step S24).

Afterwards, when the user opens the communication terminal apparatus 1 and it is detected that communication terminal apparatus 1 is not in the folded state (step S25: NO), the control unit 20 extinguishes the sub-display device (step S26), and displays the object image stored in the buffer area on the main display as a non-mirror image(step S28).

In a case where it is detected that the apparatus is not in the folded state when the photograph end instruction is given (step S22: NO), the control unit 20 causes the shutter sound or the voice saying "photograph taken" to be produced at a second volume (step S27), and displays the object image stored in the buffer area of the RAM 20b as a non-mirror image on the main display (step S28).

Note that it can be anticipated that the effective prevention of unauthorized photography will be increased by setting the first volume for informing of photography performed in the less-noticeable folded state higher than the second volume in the open state.

In a case where the communication terminal apparatus 1 is changed from the open state to the folded state by the user after photography is ended (step S29: YES), the control unit 20 displays the object image which is being stored in the buffer area of the RAM 20b on the sub-display again, as a non-mirror image (step S30).

FIGS. 7A to 7D are examples of displays performed on the sub-display and the main display after the photograph end instruction is received, assuming that the user is taking a photograph of himself/herself.

Figure 7D:
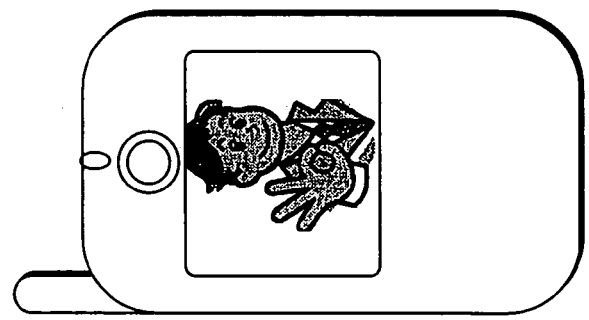
FIGS. 7A to 7D are examples of displays performed after the photograph end instruction has been received.
Figure 7C:
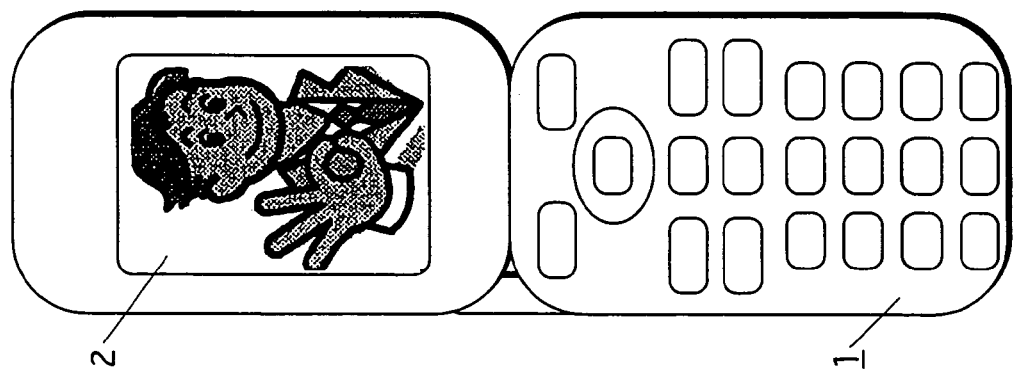
Figure 7B:
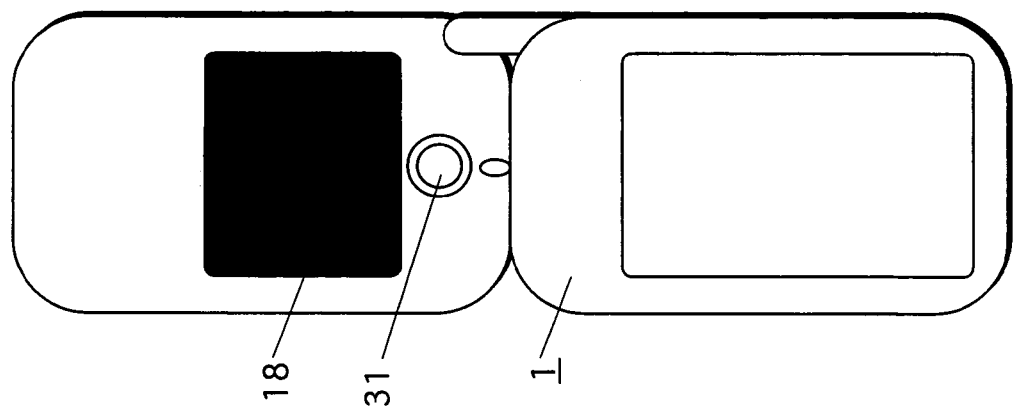
Figure 7A:
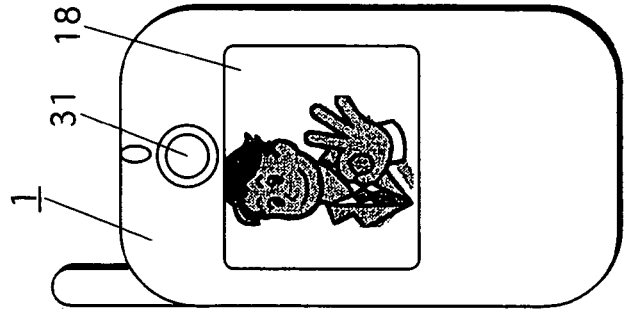

When the user opens the communication terminal apparatus 1 from the folded state when the mirror image of the buffer image is being displayed on the sub-display 18 after the photograph end instruction is received (FIG. 7A), the control unit 20 extinguishes the sub-display 18 to conserve power (FIG. 7B), and displays the buffer image on the main display 2 as a non-mirror image (FIG. 7C).

Because images displayed on the sub-display are displayed as mirror images, a person photographing himself/herself does not experience any awkwardness while looking at the sub-display. Further, because images displayed on the main display are displayed as non-mirror images, the person photographing himself/herself is able to use the main display to correctly verify that their own hand which is showing the OK sign is their right hand.

Afterward, when the user folds up the communication terminal apparatus 1, the control unit 20 displays the buffer image on the sub-display 18 as a non-mirror image (FIG. 4D).

This display presents a proper image to the user, who has already verified the non-mirror image displayed on the main display, without the user experiencing any awkwardness.

<Timer Photography>

Next the timer photography operations of the communication terminal apparatus of the present invention having the abovementioned structure are described in detail. Note that here it is assumed that the user performs timer photography while verifying the photographed images by means of the sub-display 18, having opened the communication terminal apparatus to approximately an L-shape, so that the second casing acts as a platform.

Figure 8:
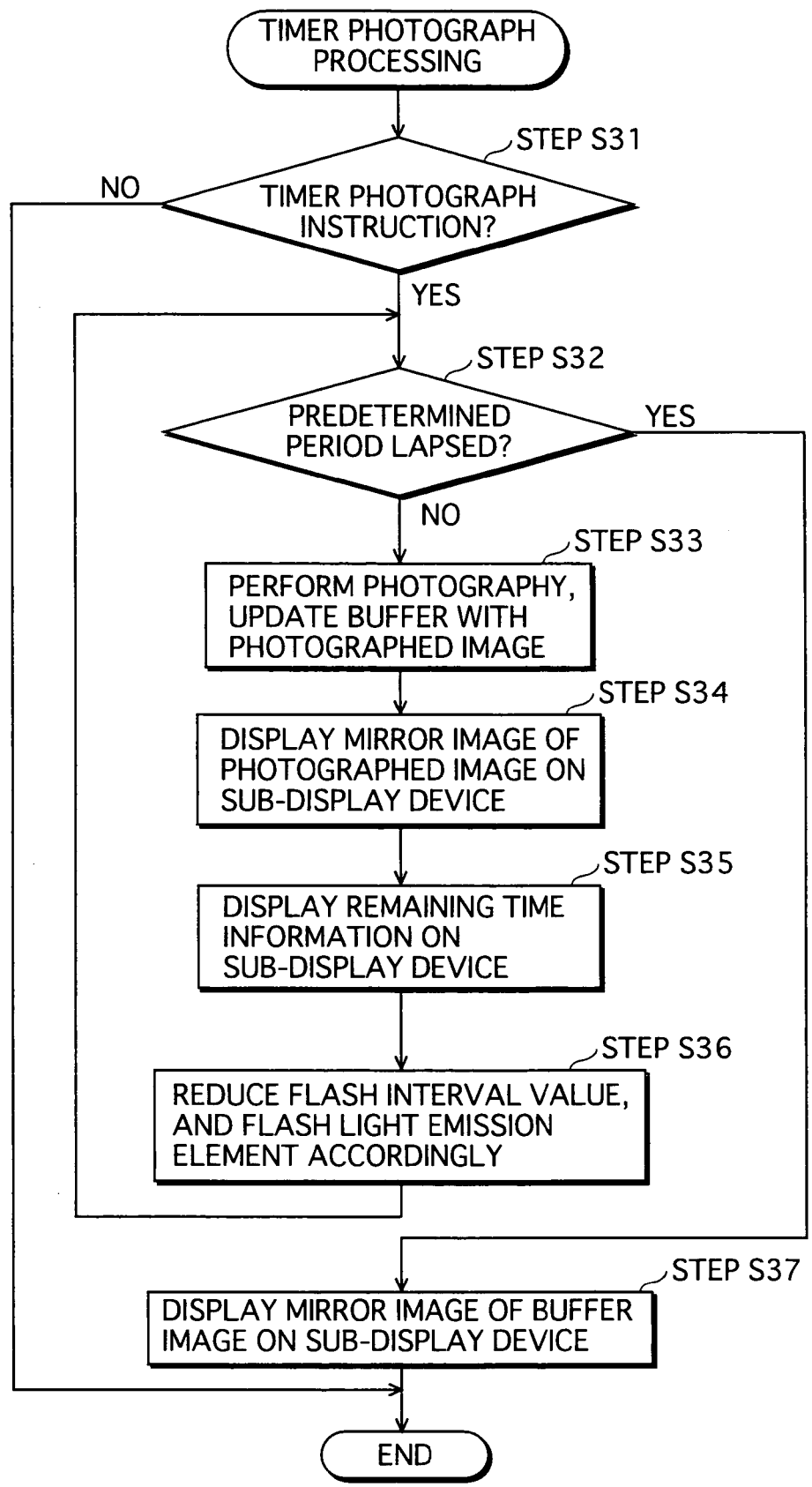
FIG. 8 is a flowchart showing operations of the communication terminal apparatus in response to a timer photograph instruction.

FIG. 8 is a flowchart which shows operations performed in the communication terminal apparatus 1 when a timer photograph instruction is received from the user.

When the user presses a timer photograph key (for example the hash key) which is included in the numeric keys 8, (step S31: YES), the control unit 20 issues a photograph instruction to the camera unit 25, the camera unit 25 takes photographs periodically until a predetermined period (which is also called a timer period) lapses (step S32: NO), and outputs image data to the control unit 20 via the camera I/F 26, and the control unit 20 updates the buffer area of the RAM 20b with the image data every time a photograph is taken (step S33).

When the control unit 20 obtains image data, it displays the object image as a mirror image (step S34), together with a countdown of time remaining in the timer period (step S35) on the sub-display.

Also, at this time, the control unit 20 has the incoming-call LED 32 perform the flashing light emission periodically responding to the time remaining (step S36). Specifically, reducing a flash interval value every time photography is performed, and having the flashing light emission performed according to the flash interval value, enables the person who is the object of the photograph to know the approximate timing of the end of the timer period.

Processing from step S32 onward is repeated every predetermined period, from when the timer photograph instruction is received until when the timer period lapses.

After the timer period lapses (step S32: YES), the control unit 20 stops further photography, and displays the last object image photographed by the camera apparatus 31 which is stored in the RAM 20b buffer area on the sub-display as a mirror image (step S37).

FIGS. 9A to 9D are examples of displays performed on the sub-display and the main display from when the timer photograph instruction is received until the timer period lapses.

Figure 9D:
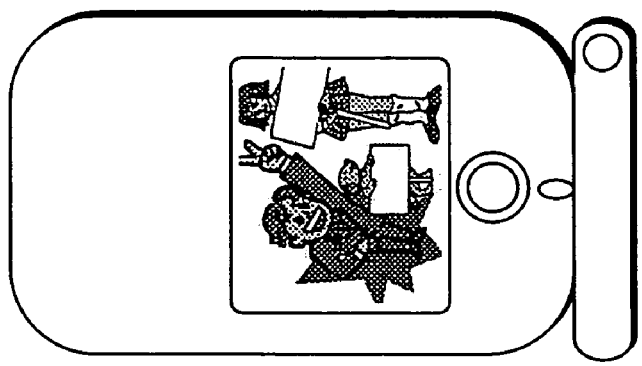
FIGS. 9A to 9D are examples of displays performed after the timer photograph instruction has been received.
Figure 9C:
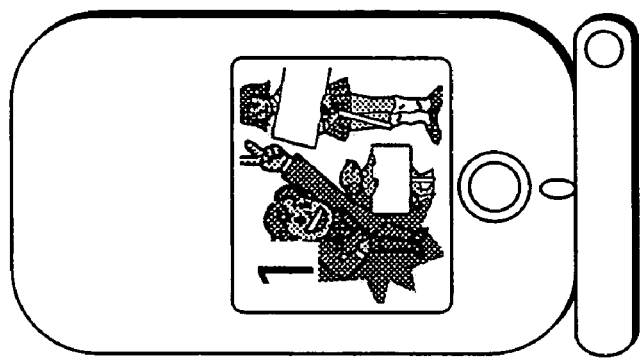
Figure 9B:
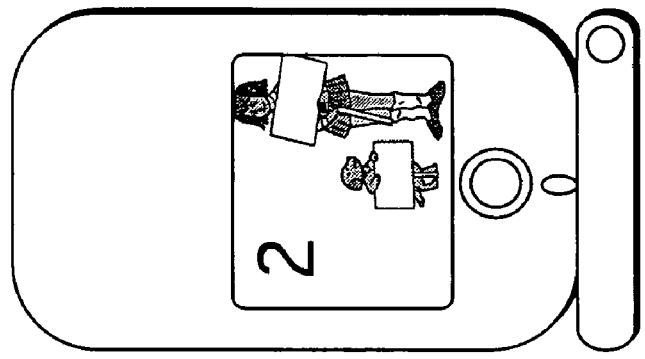
Figure 9A:
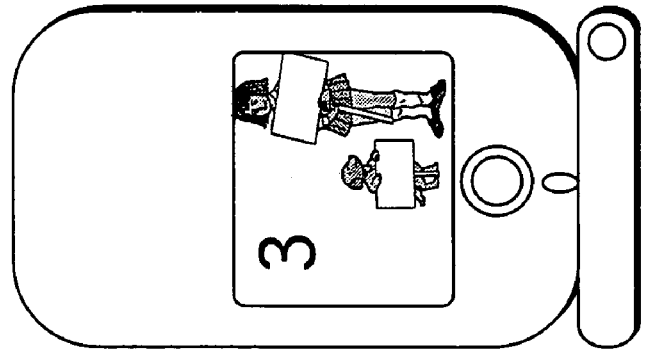

When the user presses the timer photograph key (for example the hash key) included in the numeric keys 8, the control unit 20 starts periodic (for example every 0.1 second) photography by sending a photograph instruction to the camera unit 25, and displays an object image as a mirror image, together with the countdown of a number of seconds remaining in the timer period, on the sub-display 18 every time a photograph is taken (FIGS. 9A to 9C). After the timer period has lapsed, the last photographed object image is displayed on the sub-display 18 as a mirror image (FIG. 9D).

<Photographed Image Display During Incoming Call>

The mobile terminal apparatus 1 stores image data (particularly Images such as photographs of people with whom communication may be performed), phone numbers, and names, in correspondence with each other. When a phone number of a caller which is notified when a call is received matches a stored phone number, an image expressed by the image data stored in correspondence with the phone number is displayed on the main display 2 or the sub-display 18 together with the name stored in correspondence with the phone number.

FIG. 10 shows an example of the structure and contents of phone book data 100 which is stored in the RAM 20b and the image storing unit 20c in order to realize the function of photographed image display during incoming-call. The phone book data 100 has a telephone number column 101, an image data column 102, and a name column 103, which respectively hold telephone numbers, image data showing photographed images, and character strings showing names, in correspondence.

Figure 11:
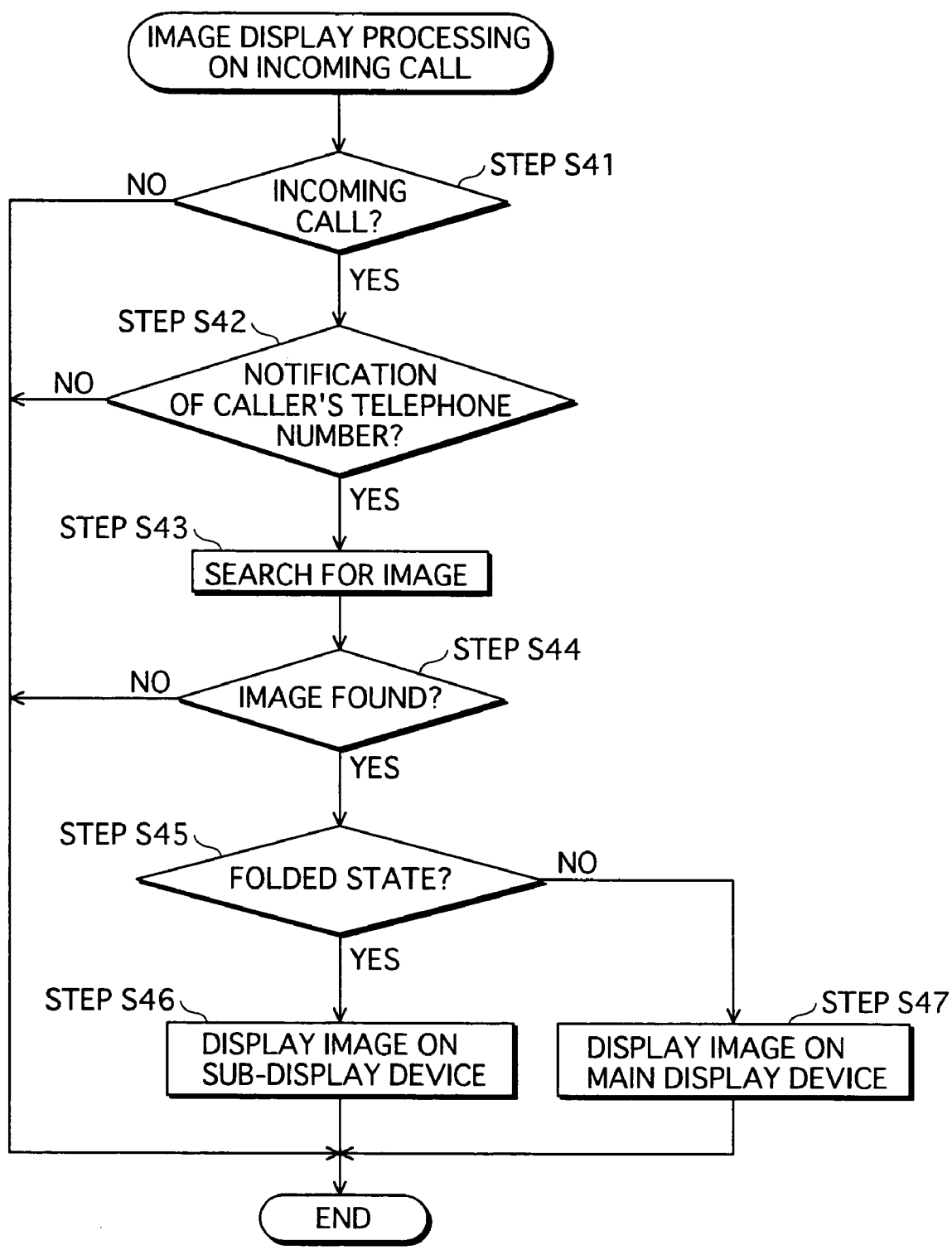
FIG. 11 is a flowchart showing image display operations performed when a call is received.

FIG. 11 is a flowchart showing image display operations performed when a call is received.

When a call is received (step S41: YES), together with notification of the caller's phone number (step S42: YES), the control unit 20 searches for the phone number in the telephone book table 100 (step S43). If a matching telephone number is found (step S44: YES), a judgment is made of whether or not the communication terminal apparatus 1 is in the folded state (step S45), and the image expressed by the image data, and the row of text showing the name, which are both stored in correspondence with the telephone number, are displayed on the sub-display if judged that the communication terminal apparatus 1 is in the folded state (step S46), or on the main display if judged that the communication terminal apparatus 1 is not in the folded state (step S47).

Note that the telephone numbers and names recorded in the telephone book data 100 are inputted in advance in correspondence with the photograph images by the user, via the numeric keys 8 and the like.

The function of photographed image display during incoming-call enables the user to know the identity of the caller immediately when a call is received, and thus facilitates effective use of photographed images.

<Variations>

Note that although the present invention is explained here based on the abovementioned preferred embodiment, the present invention is in no way limited to the preferred embodiment, and also includes the following.

The present invention may also be a method including the steps explained in the preferred embodiment. The present invention may further be a computer program which uses a computer system in order to realize this method, or a digital signal which shows the computer program.

The present invention may also be a computer-readable recording medium such as a flexible disk, a hard disk, a CD-ROM, an MO, a DVD, a DVD-ROM, a DVD-RAM, or a semiconductor memory or the like, to which the abovementioned program or digital signal is recorded.

The present invention may also be the abovementioned computer program or digital signal, transmitted via an electric communication circuit, a radio circuit, a wired circuit, or a network such as the Internet.

The present invention may also be a computer system provided with a microprocessor and a memory, the memory storing the program, and the method being realized by the microprocessor operating according to the program recorded in the memory.

The program or digital signal may be recorded on the recording medium, and transported via the network or the like, to another independent computer system, where the program or digital signal is carried out.

INDUSTRIAL APPLICABILITY

The communication terminal apparatus of the present invention can be applied to a folding mobile telephone and a folding mobile information terminal having photography functions, which use a mobile communication service such as PHS, PDC and the like, and mobile communication services using a CDMA system.

The invention claimed is:

1. A communication terminal apparatus that has a photography function, and is made up of a first casing and a second casing which are foldably connected to each other, the communication terminal apparatus comprising:
    a detecting unit operable to detect whether or not the first and second casings are in a folded state;
    a photographic lens provided on a first surface of the first casing, the first surface being exposed when the first and second casings are in a folded state;
    a first display device that is for displaying a photographed image, and that is visible in a same field of view as the lens; and
    a second display device that is for displaying the photographed image, and that is provided on a second surface of the first casing, the second surface being concealed when the first and second casings are in the folded state,
    wherein when the detecting unit is detecting that the first and second casings are in the folded state, the first display device displays a minor image of a photographed image, and the second display device is in an unilluminated state, and
    when the detecting unit is detecting that the first and second casings are not in the folded state, the second display device displays the image being photographed, and the first display device is in an unilluminated state.

2. The communication terminal apparatus of claim 1 wherein the lens is positioned on a line which divides a width of the first display device substantially in half.

3. The communication terminal apparatus of claim 2, wherein the lens and the first display device are both positioned substantially in a widthwise center of the first surface.

4. The communication terminal apparatus of claim 1, having a construction such that a battery is detachable from a third surface of the second casing, the third surface being exposed in the folded state.

* * * * *